US012594792B2

(12) United States Patent
Pannikottu et al.

(10) Patent No.: US 12,594,792 B2
(45) Date of Patent: Apr. 7, 2026

(54) TIRE WITH PRESSURE ZERO SIDEWALL HOOP RINGS AND METHOD OF MANUFACTURE

(71) Applicants: Abraham Pannikottu, Akron, OH (US); Jon Stuart Gerhardt, Charlotte, NC (US)

(72) Inventors: Abraham Pannikottu, Akron, OH (US); Jon Stuart Gerhardt, Charlotte, NC (US)

(73) Assignee: American Engineering Group, LLC, Akron, OH (US)

( * ) Notice: Subject to any disclaimer, the term of this patent is extended or adjusted under 35 U.S.C. 154(b) by 0 days.

(21) Appl. No.: 18/390,761

(22) Filed: Dec. 20, 2023

(65) Prior Publication Data

US 2024/0217273 A1     Jul. 4, 2024

Related U.S. Application Data

(60) Provisional application No. 63/435,935, filed on Dec. 29, 2022.

(51) Int. Cl.
*B60C 13/00*        (2006.01)
*B60C 17/00*        (2006.01)

(52) U.S. Cl.
CPC ............ *B60C 13/009* (2013.01); *B60C 17/00* (2013.01)

(58) Field of Classification Search
CPC . B60C 2013/026; B60C 15/05; B60C 15/028; B60C 17/0036; B60C 17/0045; B60C 13/002; B60C 13/02; B60C 13/0009; B60C 17/00
See application file for complete search history.

(56) References Cited

U.S. PATENT DOCUMENTS

2019/0232732 A1*   8/2019   Kirby .................... B60C 17/043
2020/0223263 A1*   7/2020   Tamura ................ B60C 13/009

* cited by examiner

*Primary Examiner* — Justin R Fischer
(74) *Attorney, Agent, or Firm* — Renner, Kenner, Greive, Bobak, Taylor & Weber Co., LPA

(57)        ABSTRACT

The invention relates to a pneumatic tire with a toroidal shaped tire carcass having sidewalls and a tread. A typical method of allowing a tire to run even in a punctured state is a method of reinforcing the sidewall area to support the load in the airless state. The present invention discloses both sidewalls having a hoop ring circumferentially molded in-place at the middle portion of both sidewalls or as floating multiple hoop rings bonded in-place at the middle portion in the tire inside sidewalls for supporting the vehicle load in a run-flat condition.

2 Claims, 2 Drawing Sheets

TIRE WITH PRESSURE ZERO SIDEWALL HOOP RINGS AND METHOD OF MANUFACTURE

CROSS-REFERENCE TO RELATED APPLICATION

This application claims priority to provisional application No. 63/435,935, filed Dec. 29, 2022, for "Tire With Pressure Zero Tire Rings Molded In Sidewalls And Method Of Manufacture."

FIELD OF THE INVENTION

The invention herein resides in the art of pneumatic tires and, more particularly, to a pneumatic tire capable of running for significant distances at high speeds and at pressure zero, as compared to "run flat" tires of the prior art. Particularly, the invention relates to a pneumatic tire having tire hoop rings molded in the sidewalls or hoop rings bonded onto the inside of sidewalls thereof to provide sufficient strength and stability to the tires to accommodate zero pressure operation for distances and speeds heretofore unattainable.

BACKGROUND OF THE INVENTION

What are commonly designated as "run flat" tires have been known for considerable time, but such tires have typically employed sidewalls that are simply strengthened by additional thickness of the side wall material. These run flat tires have typically been capable of running in a zero pressure condition for short distances (50 miles or less) and at low speeds (less than 50 miles per hour). Accordingly, these prior run flat tires are not suitable for use at high speeds and long distances of operation in the zero pressure state. The types of run flat tires employed for passenger vehicles and the like are simply unsuited for the rigors of numerous other applications such as in industrial, commercial and military uses.

There is a need in the art for run flat or pressure zero tires capable of operating at high speeds when in a pressure zero state.

There is a need in the art for a run flat or pressure zero tire that can function for long distances at such high speeds while in a pressure zero condition.

There is further need in the art for run flat or pressure zero tires that are capable of high speeds for long distances in the "flat" condition, yet functional as a normal pneumatic tire without the run flat capability when properly inflated.

There is yet a further need in the art for a methodology for the manufacture of a pressure zero tire having the aforementioned capabilities.

SUMMARY OF THE INVENTION

The foregoing needs for features and capabilities of a pressure zero tire as presented above are achieved by the structures and techniques presented below and shown in the accompanying drawings. In general, a pressure zero tire, according to the invention, comprises a side wall molded hoop ring for a pressure zero tire; a sidewall insert rubber composition comprising polybutene peroxide and paraquinone derivatives; said side wall having a hoop ring circumferentially molded in place at the middle portion of both sidewalls of the tire, or as multiple rings inside the tire bonded in place in the middle surfaces of both sidewalls for supporting the vehicle load in a run-flat condition; and a non-rubber molded ring secured within the side wall, said molded ring being molded embedded inside the side wall in said middle portion or installed on the inside surfaces of the sidewalls of the pressure zero tire.

Other features and aspects presented herein are achieved by a manufacturing process having additional steps to those employed in standard tire building processes, comprising: after carcass plies are placed on the building drum, covering the ends of the plies with a liner to prevent sticking of the carcass plies above where the hoop rings will be; turning up the body plies over the hoop rings; placing another strip of liner covering from where the carcass plies will end up and turn down toward the crown covering the area where the side wall strips will be placed; placing the side wall strips on the drum and inflating to shape the tire; subsequently pulling down the sidewalls to allow placement of the hoop rings; after the rings are applied, turning down the carcass plies over the hoop rings and removing the liner from the plies and then rolling the assembly to remove air; then removing the other strip of liner and replacing the side wall strips to their proper location and again rolling out air; then proceeding with a normal tire build operation.

Other features and aspects presented herein are achieved by a manufacturing process having additional steps to a completely cured tire by installing the hoop rings to the inside of both tire sidewalls as a secondary manufacturing process by bonding hoop rings using a rubber patching system.

BRIEF DESCRIPTION OF THE DRAWING

For a complete understanding of the various aspects, structure and process of the invention, reference should be made to the following detailed description and accompanying drawings wherein.

DETAILED DESCRIPTION OF ILLUSTRATIVE EMBODIMENTS

Figure 1:
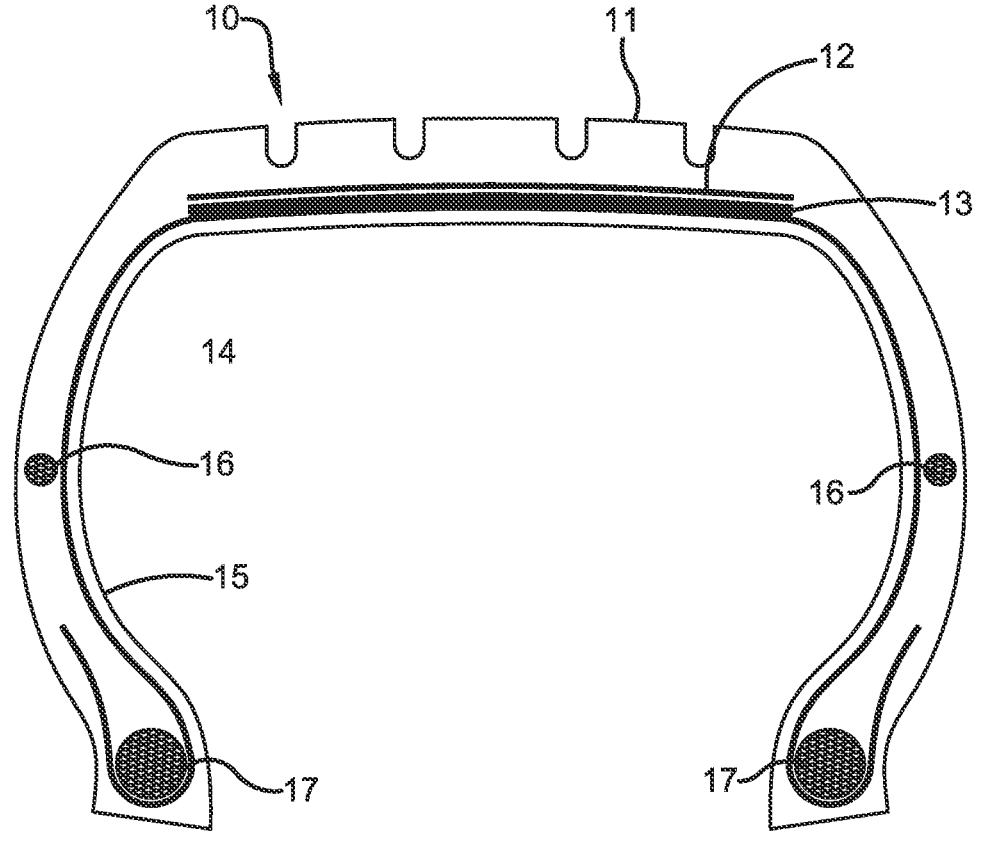
FIG. 1 is a cross-sectional view of the tire made in accordance with the invention, showing the placement of the side wall pressure zero hoop ring.

Referring now to the drawings, and more particularly to FIG. 1, it can be seen that a pneumatic tire, made in accordance with the invention, is designated generally by the numeral 10. Those skilled in the art will appreciate that the drawing of FIG. 1 shows a cross-section of the pneumatic tire, wherein a tread 11 is provided about the circumferential exterior of the tire 10, the tread 11 typically being characterized by recesses, grooves, edges, and the like. Below the tread are hoop plies 12 lying above steel cord belt plies or the like 13. A textile cord ply 14 lies beneath the steel cord belt plies 13 and extends around the interior under layer of the tire 10 to and around the bead and bead reinforcement 17. An inner liner 15 covers and seals the annular interior of the tire 10, as shown.

According to the invention of FIG. 1, a sidewall pressure zero hoop ring 16 is received within each of the opposing sidewalls of the tire as shown and comprises a circular hoop ring within each sidewall. Finally, a bead reinforcement 17 is provided to allow the bead of the tire to sealingly nest with an appropriate tire rim. The textile cord ply 14 wraps around the bead reinforcements 17 at each end of the cord ply. It will be appreciated by those skilled in the art that the sidewall pressure zero hoop ring 16 provides significant reinforcement to the sidewalls of the tire 10 sufficient to provide structural integrity to the tire sidewall in the event of a tire puncture or other cause of significant tire pressure reduction all the way to zero tire pressure. Whether intentional or accidental, pressure zero hoop rings 16 offer unparalleled reliability.

The sidewall pressure zero hoop ring 16 is a non-rubber ring, constructed of a material selected from the grouping consisting of plastic, metal, alloys, carbon fiber, natural fiber, thermoplastic and thermoplastic elastomers. In the case of the thermoplastic construction, the sidewall pressure zero hoop ring is constructed of ultra-high molecular weight polyethylene. In one embodiment of the invention, the ultra-high molecular weight polyethylene is provided as a coating on a molded ring made of thermoplastic or thermoplastic elastomer. Further, according to an embodiment of the invention, the non-rubber molded ring may comprise an ultra-high molecular weight polyethylene disbursed in a non-ultra-high molecular weight polyethylene hoop to ensure sufficient load bearing capacity by both sidewalls of the tire 10. It is further presented that in an embodiment of the invention the pneumatic tire 10 has a nonrubber molded ring that is secured within molded ring 16 that is secured within the sidewalls of the tire 10 to form a pressure zero ring as a hoop ring. That hoop ring may indeed be a bubble ring formed within the sidewalls of the tire 10 subsequent to vulcanization of the tire.

The hoop ring as presented herein transfers the load to the top section of the hoop, rather than, as in the prior art, beneath the footprint area of the pressure zero tire where the load is carried at the bottom of the tire. The prior art was inefficient and given to the generation of undesirable heat due to over compression.

The forming of the non-rubber molded ring is achieved by secured engagement within the sidewalls by turning the side wall up and back down over the hoop ring during manufacture.

According to other embodiments of the invention, the pneumatic tire 10 may comprise a second pair of hoop rings that are provided with a circumferentially extending continuous middle portion in both sidewalls. Moreover, the rings may be composed of metal rods welded to form the rings. In other embodiments, the rings may be formed from rubber coated with multiple hoops. In yet another embodiment of the invention, the rings may be formed from rubber coated wire and rubber coated carbon fiber wound as multiple hoop rings.

It is contemplated that the pneumatic tire 10 may be made with a typical manufacturing process for pneumatic tires, but including a couple more steps compared to the standard process. After the carcass plies are placed on the building drum, the ends of the ply with the liner are covered to prevent sticking of carcass plies above where the hoop rings will be placed. The carcass plies are then turned up over the bead. Then, another strip of liner covering is placed from where the carcass plies will end up being turned down toward the crown covering the area where the side wall strips will be placed. Then, the sidewall strips are placed on the drum and the carcass is inflated to shape the tire. Thereafter, the sidewalls are pulled down to allow placement of the hoop rings. After the rings are applied, the carcass plies are pulled down over the rings and the liner is removed from the ply which are rolled to remove captured air. Subsequently, the other strip of liner is removed and replaced by sidewall strips to their proper location and, again, captured air is rolled out. At that time, the tire carcass proceeds with the normal build to achieve the built and cured tire 10.

Figure 2:
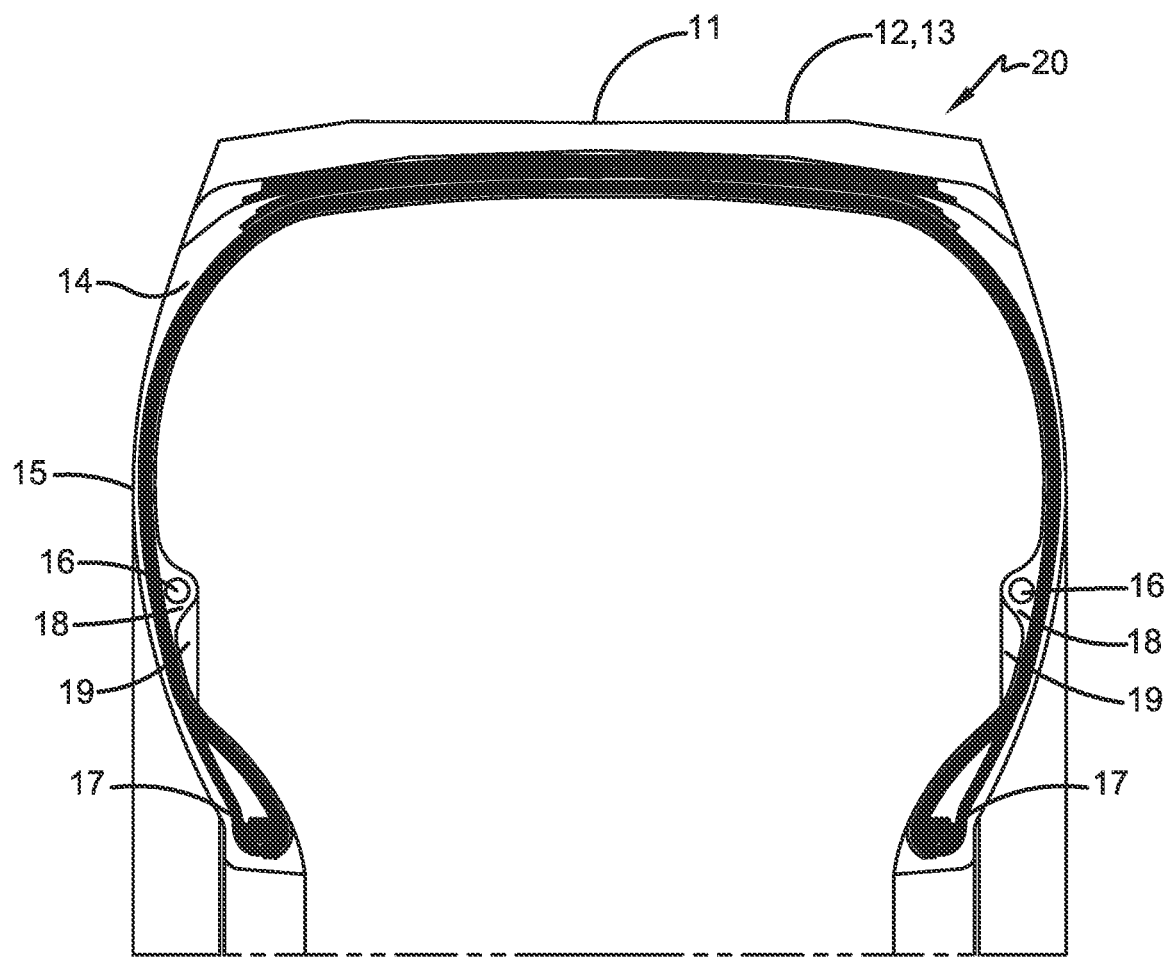
FIG. 2 is a cross-sectional view of a tire made in accordance with the invention, showing the placement of the side wall pressure zero hoop ring being bonded on the inside of the sidewalls.

With reference now to FIG. 2, an appreciation can be obtained with regard to a second embodiment of the invention, as briefly mentioned above, and which can be incorporated in combination with the embodiment 10 of FIG. 1 or as an independent adaptation. As shown in FIG. 2, it can be seen that another embodiment of the invention is designated generally by the numeral 20. As with FIG. 1, FIG. 2 shows a cross-section of a pneumatic tire where a tread 11 is provided about the circumferential exterior of the tire 20, the tread 11 typically being characterized by recesses, grooves, edges and the like. Below the tread are hoop plies 12 lying above steel cord belt plies or the like 13. Textile cord ply 14 lies beneath the steel cord belt plies 13 and extends around the interior underlayer of the tire 20 to and around the bead and bead reinforce 17. In inner liner 15 covers and seals the annular interior of the tire 20 as shown.

According to this embodiment of the invention, a pressure zero hoop ring 16 is bonded onto the inside surface of the middle of both side walls for supporting the vehicle load in a run-flat condition. The steel hoop rings 16 are secured to the inner side-wall by means of a rubber patch 18 by appropriate rubber patch bonding material. Each of the bonded hoop rings is secured by a support ring 19 attached to the inner side-wall of the tire and providing vertical support thereto. The support rings may be made of any suitable material such as metallic or polymeric material, such as steel, spring steel, copper, carbon fiber, fiberglass, titanium or multiple spring wire, which may be formed in the nature of a beam, as shown, for added strength and rigidity to facilitate the run-flat or zero pressure condition. As with the embodiment of FIG. 1, the inner hoop rings 16 of the tire 20 of FIG. 2 may be made of any innumerous materials, including those advanced with regard to the tire 10 of FIG. 1. Moreover, the invention contemplates not only that the embodiments of FIGS. 1 and 2 may be employed independently of each other, the invention also contemplates both a molded in situ hoop ring 16 as shown in FIG. 1 that is used in combination with the inner hoop ring 16 received within a rubber patch and supported by a support ring 19 as shown in FIG. 2.

Thus it can be seen that the various aspects of the invention have been achieved by the structure and technique presented above. While in accordance with the patent statutes, only the best mode and preferred embodiment of the invention has been presented and described in detail, the invention is not limited thereto or thereby. Accordingly, the scope and breadth of the invention is presented, at least in part, by the following claims.

What is claimed is:

1. A pressure zero tire, comprising:
   a pair of opposed sidewalls;
   hoop rings circumferentially and securedly received by each of said opposed sidewalls of the tire as reinforcing structures for supporting an associated vehicle load in a run-flat condition; and
   wherein each said hoop ring comprises a plurality of separate rubber coated carbon fiber rings grouped to form said hoop rings and bound by a rubber coating.

2. The pressure zero tire according to claim 1, wherein said hoop rings are molded in place as embedded reinforcing structures at a middle portion of each of said opposed sidewalls.

* * * * *